United States Patent [19]
Bersano

[11] 3,868,047
[45] Feb. 25, 1975

[54] WINE DECANTER
[76] Inventor: Donald Bersano, 15350 Winchester Blvd., Los Gatos, Calif. 95030
[22] Filed: June 25, 1973
[21] Appl. No.: 373,519

[52] U.S. Cl................................. 222/166, 214/314
[51] Int. Cl................................................. B67d 5/64
[58] Field of Search ........... 222/166, 164; 240/2.18; 248/133, 139, 138, 141; 214/314

[56] References Cited
UNITED STATES PATENTS

| | | | |
|---|---|---|---|
| 267,191 | 11/1882 | Gough ................................. | 222/166 |
| 1,085,337 | 1/1914 | Higgins ........................... | 248/141 X |
| 2,596,452 | 5/1952 | Wehmiller et al. ............ | 240/2.18 X |

Primary Examiner—Robert B. Reeves
Assistant Examiner—Charles A. Marmor
Attorney, Agent, or Firm—Allen & Chromy

[57] ABSTRACT

A device for decanting wine so that practically all of the wine in a bottle may be emptied therefrom without agitating the dregs and other solid matter that normally rests on the bottom in the bottle. In this device the wine bottle is supported substantially in a predetermined position by a cradle that is pivotally supported by a frame. Means is provided for gradually tilting the bottle as wine is decanted therefrom while the operator observes a light positioned below the neck of the bottle to observe if any dregs or other solid matter is being carried by the wine.

1 Claim, 5 Drawing Figures

PATENTED FEB 25 1975
3,868,047
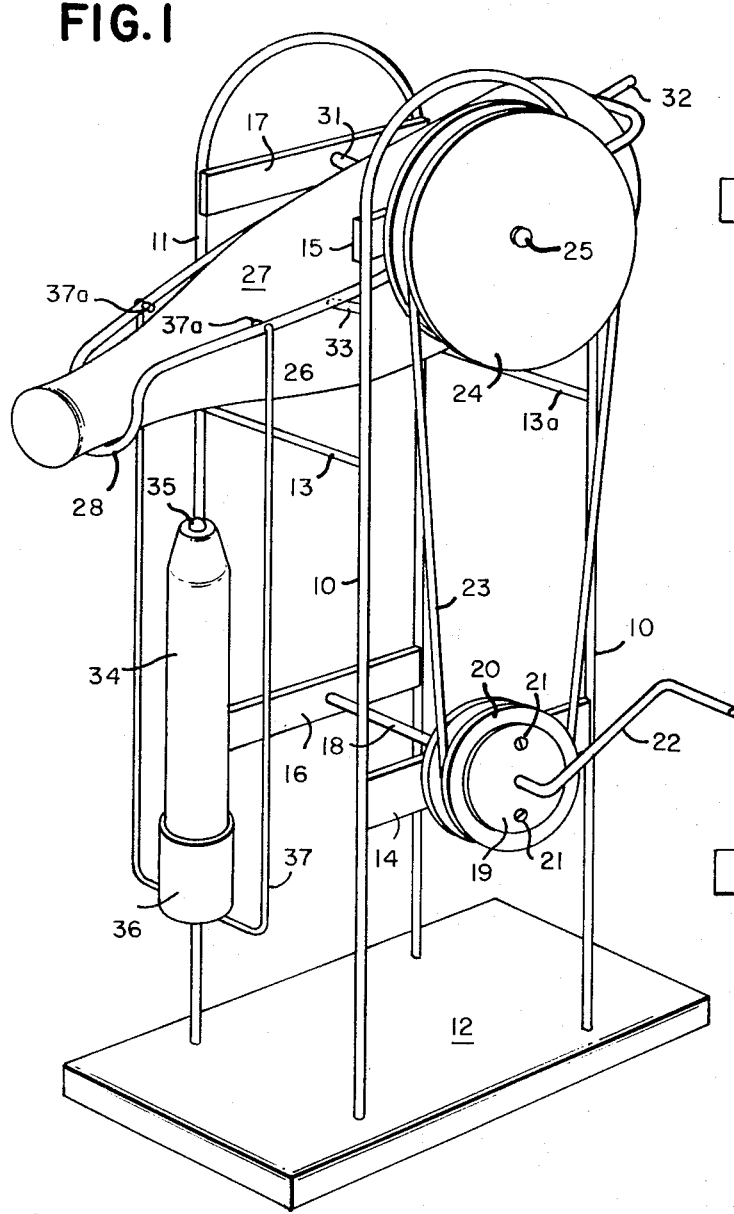
FIG.1
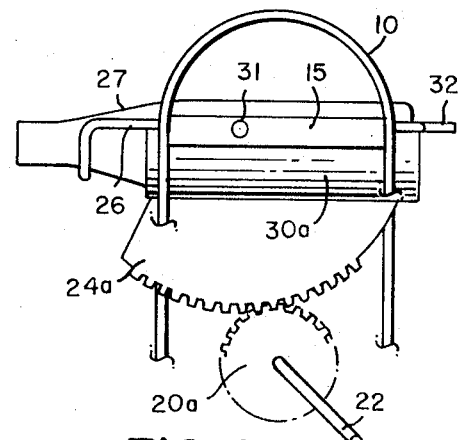
FIG.4
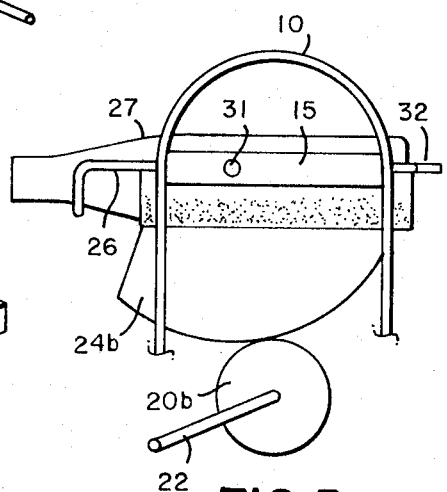
FIG.5
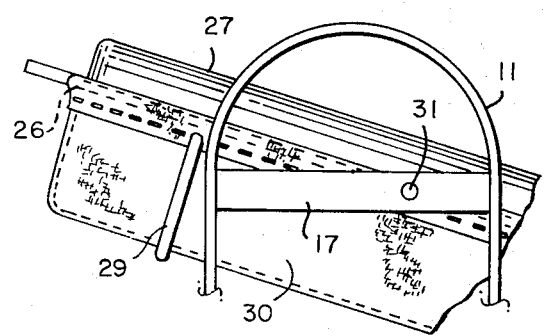
FIG.3
FIG.2

3,868,047

WINE DECANTER

DESCRIPTION OF THE INVENTION

This invention relates to wine decanters in general and more particularly it relates to wine decanters constructed to reduce the pouring out of the bottle of dregs and other foreign particles that may be located in the bottom of the wine bottle.

An object of this invention is to provide an improved wine decanter that may be used with different sizes and shapes of wine bottles.

Another object of this invention is to provide an improved wine decanter with a wine-supporting cradle that is constructed to hold wine bottles of different sizes and shapes and prevent such bottles from slipping during the wine decanting operation so that the dregs normally occurring in the bottom of the wine are not agitated during the decanting operation.

Still another object of this invention is to provide an improved wine decanting apparatus in which the wine bottle is supported in a substantially horizontal position and which is provided with means for projecting a beam of light through the neck of the wine bottle so that the operator can observe if dregs or other solid matter is being poured with the wine during the decanting operation.

Other and further objects of this invention will be apparent to those skilled in the art to which it relates from the following specification, claims and drawing.

In accordance with this invention there is provided an efficient wine decanting device that may be economically manufactured. This device is provided with a main frame on which the wine-supporting auxiliary frame is pivotally mounted. The main frame is also provided with means for gradually tilting the wine bottle-supporting frame during the decanting of the wine from the bottle. The device is also provided with a light-supporting means positioned so that light is projected therefrom through the neck of the wine bottle whereby the operator can observe if any dregs or other solid matter is being carried out of the bottle by the wine during the decanting operation.

Further details and features of this invention will be set forth in the following specification, claims and drawing in which, briefly:

FIG. 1 is a perspective view of an embodiment of this invention;

FIG. 2 is a fragmentary view showing the mounting of the bottle-supporting frame on the frame of the device;

FIG. 3 is a top view of the bottle support;

FIG. 4 is a fragmentary view of a modified form of wine bottle tilting device provided to this invention; and FIG. 5 is a fragmentary view of still another modified form of bottle tilting device provided to this invention.

Referring to the drawing in detail, reference numerals 10 and 11 designate two U-shaped frame members made of metal, plastic, wood or the like, and the bottom ends of these members are attached to the base 12. Cross members 13 are provided between the frame members 10 and 11 to hold these frame members in spaced relation to form the main frame. Additional members 14 and 15 are provided to the frame member 10 and similar members 16 and 17 are provided to the frame member 11. Suitable holes are provided in members 14 and 16 for receiving the shaft 18 and provide bearings therefore.

A circular metal plate 19 is attached to the shaft 18 by welding or the like and this circular plate is attached to the pulley 20 by the screws 21. The outer end of the shaft 18 is bent to form a crank 22 so that the pulley 20 may be rotated thereby. A belt 23 is provided between the pulley 20 and the pulley 24 which is attached to the outer end of the shaft 25. The shaft 25 extends through a hole provided in the member 15 and the inner end of this shaft is attached to the auxiliary frame 26 which is shaped roughly to conform to the outline of the bottle 27. The auxiliary frame 26 is provided with a loop-shaped portion 28 that is adapted to receive the neck of the bottle 27. The rear part of the auxiliary frame is provided with a semicircular member 29 shaped to receive the larger diameter of the bottle. A canvas sheet 30 is attached to the frame 26 to grip the bottle 27 and prevent it from slipping. A stub shaft 31 which is similar to the shaft 35 is attached to the other side of the frame 26 and this stub shaft is received in a hole in the member 17. Thus, the frame 26 and bottle 27 are rotatably supported by the shafts 25 and 31 on the members 15 and 17, respectively.

A stop 32 is attached to the rear of the frame 26 and this stop engages the cross member 13a to prevent the frame from turning beyond this point. Another stop 33 is attached to the frame member 10 to engage the frame 26 and limit the rotation thereof past the tilted position shown in FIG. 1.

A light source which may be in the form of a small candle or it may be a flashlight as shown. In either case the light source 34 is supported in the socket 36 that is attached to the wire member 37. When a flashlight is used as a light source it is provided with a lense type bulb 35. The wire member 37 is provided with upwardly projecting arms that have the upper end portions thereof bent inwardly as indicated at 37a and these inwardly bent parts are pivotally supported in holes provided in the frame 26 so that the light source 34 is adapted to swing and always assumes a vertical position directly under the neck portion of the bottle 27. Thus, the light emitted by the light lamp 35 is projected through the neck of the bottle during the wine decanting process.

The wine bottle 27 is gradually tilted by turning the crank 22 so that the bottle is positioned to pour the wine therefrom. At the same time the light from the source 34 is projected upward to illuminate the wine flowing through the neck of the bottle so that the operator can see if the wine flowing through the neck is clear or cloudy.

In FIGS. 4 and 5 there are illustrated two variations of the bottle tilting mechanism. The arcuate member 24a which has a center at 31 may be attached either to the frame 26 or to the bottom of the cradle 30a that is of metal, plastic or the like. The member 24a is provided with gear teeth that mesh with gear teeth provided to the smaller gear 20a. Gear 20a is attached to the handle 22 that is integral with a shaft such as shaft 18 shown in FIG. 1 which is supported on the main frame members 10 and 11. The tilting mechanism shown in FIG. 5 is provided with an arcuate member 24b that is similar to member 24a except that 24b is driven by the wheel 20b by frictional contact. The friction wheel 20b is attached to the handle 22 which is supported on the main frame by the shaft 18. The arcuate member 24b is attached to the bottle cradle or to one of the shafts provided to the auxiliary frame so that this member 24b rotates about the center of its supporting shaft.

While I have shown and described a preferred form of the invention, it will be apparent that the invention is capable of variation and modification from the form shown so that the scope thereof should be limited only by the scope of the claims appended hereto.

What I claim is:

1. In apparatus for decanting wine and the like the combination comprising a main frame, means comprising a cradle-shaped frame for supporting a bottle with wine therein, stub shafts attached to opposite sides of said cradle-shaped frame journaled on said main frame for pivotally supporting said cradle-shaped frame on said main frame, means for gradually tilting said supporting means to bring said bottle into its wine pouring position, a light source, means attached to one of said frames for supporting said light source under the neck of said bottle, said light source projecting rays of light through the neck of said bottle to illuminate the wine as said wine is poured from said bottle to render any solid matter flowing out of said bottle with said wine visible.

* * * * *